United States Patent [19]

Wisotzky

[11] 3,772,474

[45] Nov. 13, 1973

[54] DIAL PULSE CORRECTING CIRCUIT

[75] Inventor: Otto G. Wisotzky, San Francisco, Calif.

[73] Assignee: GTE Automatic Electric Laboratories Incorporated, Northlake, Ill.

[22] Filed: Jan. 31, 1972

[21] Appl. No.: 222,175

[52] U.S. Cl. .......... 179/16 EA, 328/164

[51] Int. Cl. .......... H04q 1/36

[58] Field of Search .......... 179/16 E, 16 EA, 179/16 EC, 16 F, 15 AD; 328/164

[56] References Cited

UNITED STATES PATENTS

| | | | |
|---|---|---|---|
| 3,700,821 | 10/1972 | Savage | 179/16 EA |
| 3,671,875 | 6/1972 | Pento | 328/129 |
| 3,659,055 | 4/1972 | Witmore | 179/16 E |
| 3,504,290 | 3/1970 | Earle | 179/16 EA |
| 3,452,220 | 6/1969 | Fritschi | 179/16 E |

*Primary Examiner*—William C. Cooper
*Assistant Examiner*—Randall P. Myers
*Attorney*—K. Mullerheim et al.

[57] ABSTRACT

Circuitry is disclosed which will reshape uncorrected direct current input pulses so as to provide corrected output pulses that have at least the desired minimum "break" and "make" intervals. Two logic timing circuits are interconnected and the input of the first timing circuit accepts the uncorrected dial pulse signal. This signal must be present for a minimum first predetermined time interval before an indication appears at the output of said first timer. A change in state at the output of said first timer activates said second timer which insures that the changed condition will be maintained for a minimum period of time. After its return to its original state the first timing circuit will provide a minimum time interval before the circuit again changes state which is determined by the minimum first predetermined time interval.

7 Claims, 3 Drawing Figures

PATENTED NOV 13 1973 3,772,474

SHEET 1 OF 3

DIAL PULSE CORRECTING CIRCUIT

BACKGROUND OF THE INVENTION

This invention relates to dial pulse repeating and correcting circuits and more particularly to pulse repeating and correcting circuits which utilize integrated circuit logic networks to provide the timing necessary for pulse correction of a dial pulse signal. While tone dialing techniques are presently being introduced for use in the telephone switching network, it is well known that many of the telephone switching systems that provide control functions as well as supervisory indications are transmitted in the form of direct current pulses. The common and almost universal use of dial pulses under the control of the calling customer, or an operator for extending a connection, is an illustration of this type of signaling.

Each so-called dial pulse includes two basic elements referred to as the "make" interval and "break" interval of a pulse. As used in connection with dial pulsing the "make" interval encompasses the period of time during which the dial pulse contacts are closed, whereas the "break" interval refers to the period of time during which the dial pulse contacts are open. A particular train of dial pulses is designed to conform to certain minimum time durations for both the "break" interval and "make" interval of a dial pulse. For example, if a dial pulse rate of 10 pulses per second is assumed the sum of the "make" and "break" intervals for each pulse is equal to 100 milliseconds. Proper operation of the dial switching equipment requires that the "break" interval be considerably longer, about one and one-half times as long as the "make" interval. For the instant example, the desired "break" interval is approximately 60 milliseconds and the desired "make" interval is approximately 40 milliseconds.

The necessity for maintaining appropriate minimum intervals for both the "break" and "make" intervals of the dial pulse has been the subject of numerous innovations. This requirement may occur either at the transmitting or the receiving end of the signaling system or it may be necessary to use pulse correction at both ends in order to insure that the minimum pulse intervals are obtained. One cause of the problem at the transmitting end is that the subscriber who is dialing a particular number does not allow the dial to run freely under its own spring pressure but in fact forces the dial to return at a different rate from that set by the governor. This adversely affects the "break"-"make" ratio and can cause pulse distortion. It is also well known that the transmission path between the subscriber's circuit and the switching equipment can affect the pulse so that it becomes distorted and modified in time duration so as to adversely affect the "break"-"make" ratio, by its passage through the inductive and capacitive impedances of the subscriber loop circuit.

Transmission of the dial pulse signal through the switching office and the transmission equipment to a receiving terminal also can introduce distortion and a modification in time duration of the pulses which also adversely affects the dial pulse signal and may cause sufficient distortion so that dialing errors could occur.

In either case correction of the dial pulse signal is desired and maintenance of minimum "make" and minimum "break" pulse intervals are necessary to proper performance of the switching equipment.

SUMMARY OF THE INVENTION

In its broad aspect, the present invention contemplates the use of two timing circuits which co-act to provide minimum timing intervals for the "make" and "break" intervals of the dial pulse. The outputs of the two timing circuits are applied to logic means which, under control of the two timing circuits, creates at least minimum "make" and "break" intervals of each pulse provided that the initial "break" condition applied to the input of a first timing circuit has a duration that exceeds a first predetermined timed interval. This assures that the pulse correcting and repeating circuitry does not initiate a pulse in response to a spurious input signal. This first predetermined time interval may also be used to assure that a minimum "make" pulse interval is maintained. However, by the use of an additional RC circuit arrangement in the first timing circuit, it is possible to introduce a new time interval which provides a minimum "make" pulse interval that has a time duration that is different than the first predetermined time interval.

The output of the first timing circuit is connected to one input of the second timing circuit. When an output of the first timing circuit changes state from "make" to "break" the timing circuit of the second timer is activated. Activation of this second timing circuit establishes the desired output condition of the second timing circuit such that the minimum pulse interval representing the "break" condition is assured. For short pulses, i.e., in the order of just a few milliseconds, at the output of the first timing circuit, the timing interval of the second timing circuit is essentially unaffected. However, for pulses at the output of the first timing circuit which are of reasonable duration, say on the order of 10 or 20 milliseconds or more, the timing circuit for the second timer discharges at a rate of approximately 1 millisecond per millisecond for the duration of the output of said first timer so that the minimum "break" interval will be retained even for pulses of reasonable duration. Further, the second timer will not completely discharge but will retain a timing interval which is equal to said first predetermined time interval. Thus for short pulse inputs to the second timer a minimum "break" interval will be obtained at the output of the second timer. For longer input pulses a "break" portion equal to that at the input will be obtained since the output timer will add to the output "break" interval the time duration subtracted by the first timer.

With respect to the first timing circuit, it is well known that the operation of normal telephone office switching equipment can cause "splits" which may result from contact bounce. A split can occur, for example, when a relay is operated. In the process of the operation of the relay, contact closures may initially occur but because of spring action the contacts open and then re-close thus causing an interruption of the pulsing interval. In order to avoid spurious operation of the timing circuitry, the first timing circuit is arranged such that one discharge path is used that is separate from the normal discharge path of the timing circuitry. This separate discharge path takes a longer time to discharge so that when splits occur these do not immediately have a reaction which would adversely affect the output of the first timing circuit. Thus the effect of the split is integrated in the timing circuitry and does not significantly affect operation.

DETAILED DESCRIPTION

Figure 1:
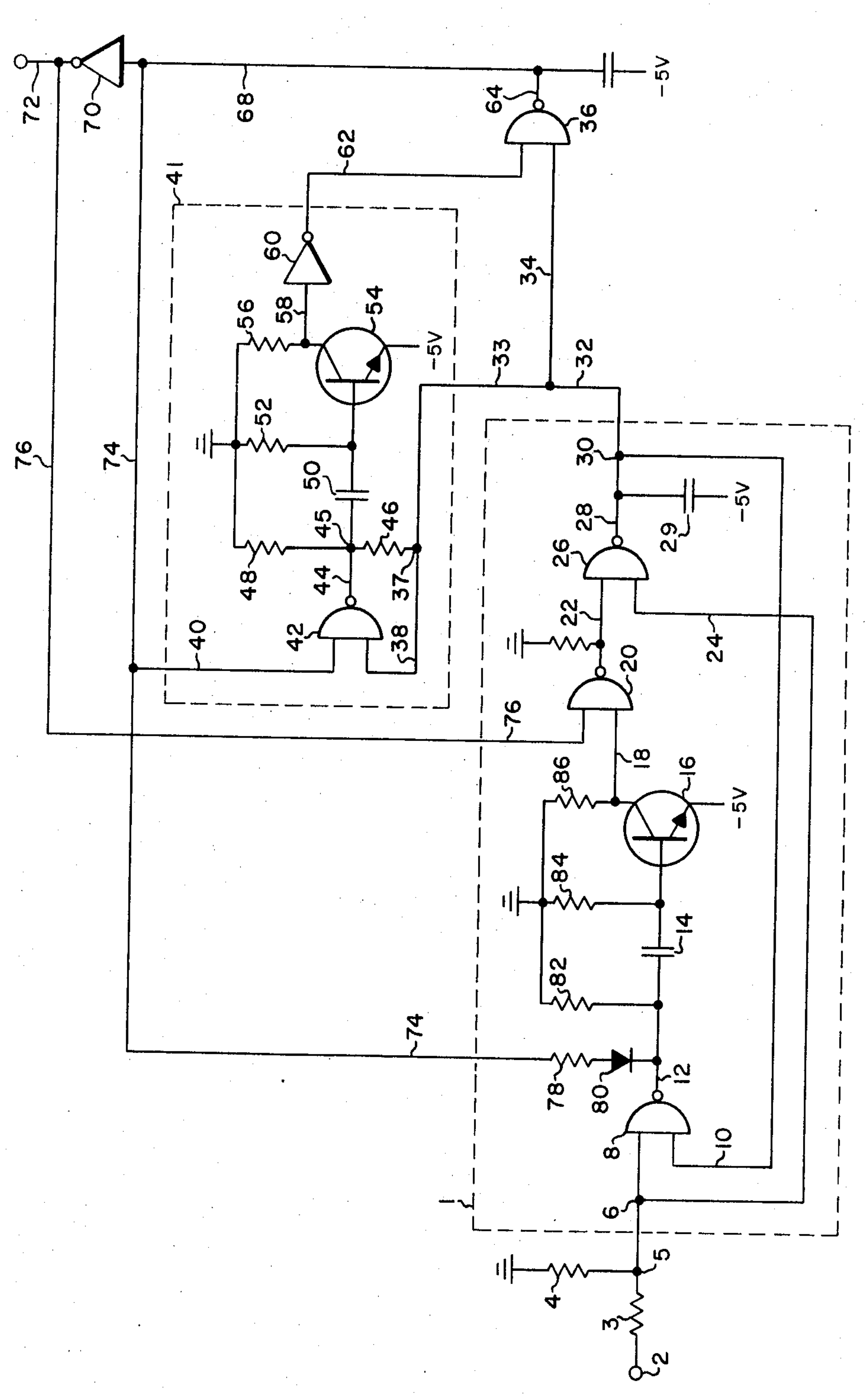
FIG. 1 shows in schematic form one specific illustrative embodiment of applicant's invention as a pulse correction circuit which has first and second timing circuits and means responsive to those timing circuits for providing the corrected pulse output.

Referring now to FIG. 1, uncorrected input dial pulses enter the pulse correction and repeating circuitry of the subject invention via lead 2. Circuitry of the first timer is enclosed by the box of dashed lines designated 1 and the circuitry of the second timer is enclosed by the box of dashed lines designated 41. The uncorrected pulses will most often have originated at the subscriber's dial in his telephone subset which is not shown, but may actually arrive at this pulse correction input circuit from trunk repeating equipment in a telephone central office, also not shown in the figure. It is well known that telephone central offices use ground or open to represent one condition to a pulse and either −24 or −48 volts d.c. to represent the other condition or interval of the pulse. The use of low level logic to provide the logic and timing sequences desired in applicant's invention necessitates the use of a voltage divider connected between the input lead 2 and ground in order to obtain a voltage in the order of −5 volts at the input to NAND-gate 8 whenever the −24 or −48 volts condition is applied to lead 2. Resistors 3 and 4 make up such a voltage divider and provide the desired voltage at junction 5. Of course, the teachings of the invention are not limited to the use of such low level logic circuits but may be readily used with discrete components or circuitry requiring different voltage conditions. For the ground or open condition on input lead 2, it is apparent that the input to NAND-gate 8 would be essentially ground and the positive logic approach would indicate that the ground or open condition would be referred to as 1 and the −5 volts condition would be referred to as 0 in the 1 - 0 logic format.

It is also desirable to relate the pulse states to the "on-hook" and "off-hook" conditions as they often are referred to with respect both to the position of the switch hook on the telephone subscriber's station set or to the "make" and "break" intervals which occur during dial pulsing conditions. If we assume, for the moment, that a telephone station set is connected between input lead 2 and ground when the telephone station set is in the idle or on-hook condition, then we would have a ground condition applied to input lead 2. Thus on-hook = ground = 1 is the logic symbol which represents this particular condition. Conversely, wheneverr the subscriber's telephone station set is off-hook a negative voltage −24 volts or −48 volts would normally be applied to input lead 2. Thus off-hook = −V = 0 is the logic symbol which represents this condition. Negative logic could also be used to implement the teachings of the invention.

IDLE CIRCUIT CONDITION

For the idle or "on-hook" condition, it will be assumed that ground (i.e., a "1") is applied to the input lead 2. Where the "on-hook" condition has been maintained for 80 or more milliseconds, transistor 16 in the first timer will be conducting because of bias conditions established via resistors 84 and 86. This places the collector output at approximately −5V and the input to NAND-gate 20 via lead 18 is −5V (i.e., a 0). As is well known, a 0 input on any input of a NAND-gate will cause a 1 (i.e., ground) output condition to occur. Thus, there will be a 1 on lead 22. The input condition on the other input lead of NAND-gate 20 does not affect this result.

During the idle circuit condition, the 1 input on lead 2 is also applied via junction 6 and lead 24 to one input of NAND-gate 26. The output from NAND-gate 20 is applied via lead 22 to the other input of NAND-gate 26. Thus, NAND-gate 26 has inputs of 1 and 1 and provides a 0 at its output. This 0 output condition is fed back to NAND-gate 8 via junction 30 and lead 10 so that NAND-gate 8 has inputs of 1 and 0 which causes a 1 output, i.e., a ground condition which is applied to lead 12. As hereinabove noted, transistor 16 is conducting so that the base of said transistor is at the approximate value of the emitter voltage, i.e., −5 volts. Actually, there is a voltage drop across the base emitter junction of about 1 volt so that the base of transistor 16 will be considered to be at about −4 volts. Under these conditions, capacitor 14 will charge to a value of about 4 volts with the transistor base side of said capacitor being negative.

With the 0 output condition at lead 28 from NAND-gate 26, NAND-gate 36 has a 0 on one input via junction 30 and leads 32 and 34. Thus, a 1 output condition will occur regardless of the input state applied to gate 36 via inverter 60 and lead 62 from the second timer 41. The output state obtained from logic gate 36 will be reversed in inverter 70 so that in the idle or "on-hook" state a −5 volts or 0 condition will occur on output lead 72. Thus, NAND-gate 36 and inverter 70 are responsive to the output of the first timer circuit during the idle or on-hook condition.

The output of NAND-gate 36 is applied via leads 68 and 74 to one terminal of resistor 78 in the first timer 1. The other terminal of 78 is connected to the anode of diode 80 and the cathode of diode 80 is connected to lead 12 which interconnects the output of NAND-gate 8 with one terminal of capacitor 14. In the idle condition both NAND-gates 8 and 36 have 1 outputs and, therefore, the potential at each end of the resistor 78, diode 80 combination is the same value. Diode 80 does not conduct.

During this idle period the input of gate 42 of the second timer has a 1 and a 0 input and, thus, provides a 1 output. The 1 input is obtained from the output of NAND-gate 36 via leads 64, 68, 74 and 40. The 0 input is obtained from the first timer output gate 26 via lead 28, junction 30, and leads 32, 33 and 38.

Note also that the output from gate 26 is applied to one end of resistor 46 via junction 37. NAND-gates 8, 20 and 42 each are of the type that have open-collector outputs and, thus, an external pull-up resistor is required to be connected to the output. The voltage at the output may vary from ground or the −5 volts value depending upon external factors which determine the voltage drop in the output path. For NAND-gate 42, the 0 (−5 volts) state, applied to the voltage divider composed of resistors 46 and 48 at junction 37, causes a negative potential of about −3.6 volts to exist at junction 45. Since transistor 54 is conducting, and we will again assume a voltage drop of about 1 volt in the base-emitter junction, the charge on capacitor 50 will be only about 0.4 volts, with the transistor base side negative.

With transistor 54 conducting, the voltage on lead 58 connected to the collector will be about −5 volts which represents a 0. This is applied to inverter 60 which then causes a 1 output to appear at lead 62 and this is applied to the second input of NAND-gate 36.

DIAL PULSING SITUATION

Figure 2:
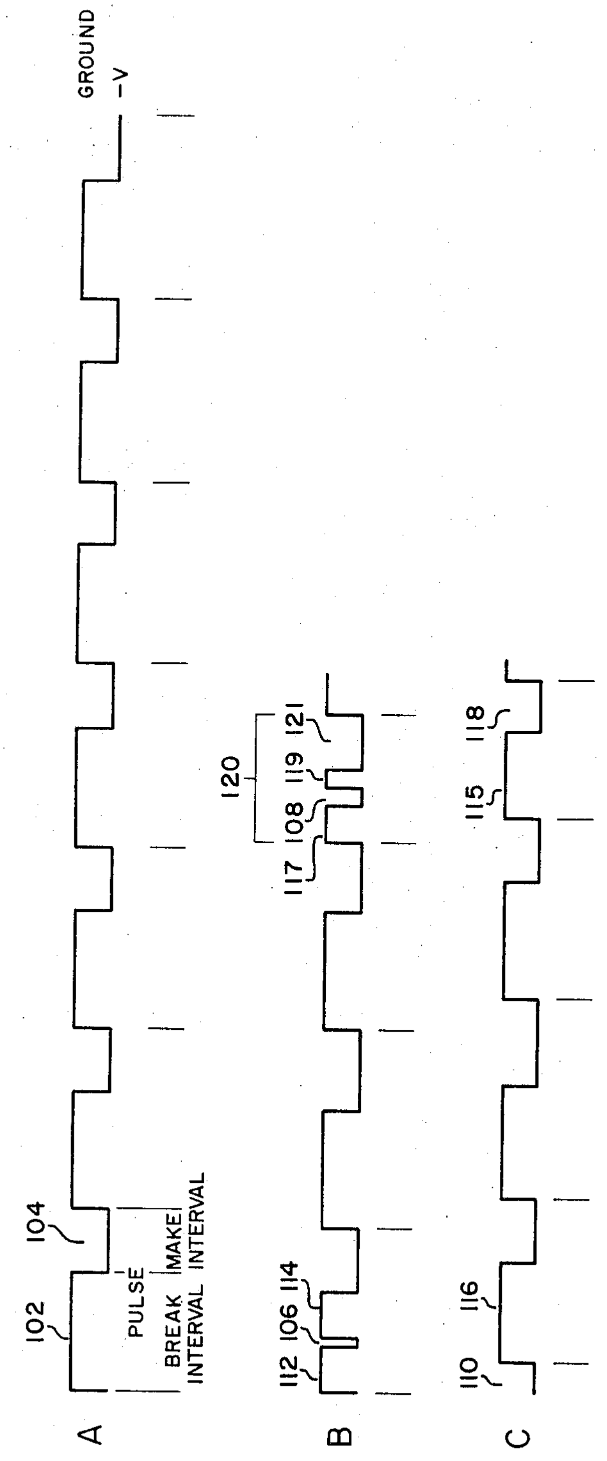
FIG. 2 illustrates three waveform conditions which represent the pulses. Waveform A illustrates the idealized condition that would be desired. Waveform B illustrates a few pulses of a distorted pulse waveform that may be encountered, and waveform C illustrates how the waveform B would be corrected by use of the teachings of the instant invention.

A clearer understanding of the operation of the pulse correcting circuitry of FIG. 1 may be obtained if the various pulse situations that may occur are known. In FIG. 2 an idealized dial pulse waveform is shown in waveform A. Note that this pulse waveform does not necessarily have to come directly from a subscriber's dial but may be either generated or it may be repeated by office switching equipment. For waveform A it is assumed that the pulse repetition rate is 10 pps so that the pulse interval is 100 milliseconds. The "break" interval of the pulse is designated 102 and the "make" interval is designated 104. In practice, pulse repetition rates as low as 7.5 pps and as high as 12.5 pps may be encountered. This means that a dial pulse may be as short as 80 milliseconds (12.5 pps rate) or as long as 133 milliseconds (7.5 pps rate). Maintenance of a "break/-make" ratio of 60 ms/40 ms as hereinbefore noted for the 10 pps rate would be desirable for the different pulsing rates but does not always occur in practice. In fact, the maintenance of the desired "make" to "break" ratio for any given dialing speed does not necessarily occur during a single digit interval that includes several pulses. While somewhat exaggerated for illustrative purposes, waveform B, FIG. 2, shows a variety of "break" to "make" ratios for four sequential pulse intervals. In addition, "splits," i.e., the situation in which the "make" or "break" intervals of a pulse are interrupted by a momentary change of state, are shown at 106 and 108 of waveform B.

Waveform C illustrates graphically the corrected pulse output that would be obtained using the pulse correcting circuitry of the subject invention to correct the pulses illustrated in waveform B. Note that a delay of about 17 milliseconds, illustrated at 110 of waveform C, is required before a change occurs in the "break" interval of the pulse. This 17 millisecond criteria was arrived at from considerations pertaining to the worst case distortion and spurious pulses which may be encountered in practice. If the "break" interval 112 of waveform B was less than 17 milliseconds, this portion of the "break" pulse would not cause an output state change on lead 72 but its duration will be memorized by the last charge on capacitor 14. During the interval 106 there will be a slight discharge through resistor 86 but the RC time constant through this path is about twice that for the first timer.

Assume for a moment that "break" interval 112 is less than 17 milliseconds. Because capacitor 14 will charge during "break" interval 112, but discharges at a slow rate during "split" 106, capacitor 14 will not completely discharge. When "break" interval 114 occurs following the split the output change will now occur in less than 17 milliseconds because of the hold-over of charge from "break" interval 112. Thus, if 112 had been in the "break" condition for an interval that was less than 17 milliseconds, the corrected "break" interval would not have started after delay 110 which is only 17 milliseconds. Instead, the corrected "break" would have started after the split 106 at a time when the "break" 112, minus split 106, plus "break" 114 is equal to 17 milliseconds. However, the "break" interval of 112 is longer than 17 milliseconds so that the corrected "break" interval 116 begins 17 milliseconds after the start of the first "break" interval at the input to the pulse correction circuitry.

The first timer thus delays the "make" or "break" portion of the pulse interval by 17 milliseconds. This would reduce the corrected "break" interval by 17 milliseconds. To prevent this, 17 milliseconds is always added to the correcting "break" interval of the pulse in the second timer. Further, the corrected "break" interval will have a minimum duration of 50 milliseconds provided the uncorrected "break" input has a duration greater than 17 milliseconds. If the "break" input is greater than 17 milliseconds, then the 50 milliseconds time duration in the second timer is reduced by 1 millisecond per millisecond. However, there will always remain a 17 millisecond time duration that will be added to the "break" interval so that the "break" interval will not be shortened by the pulse corrector.

Figure 3:
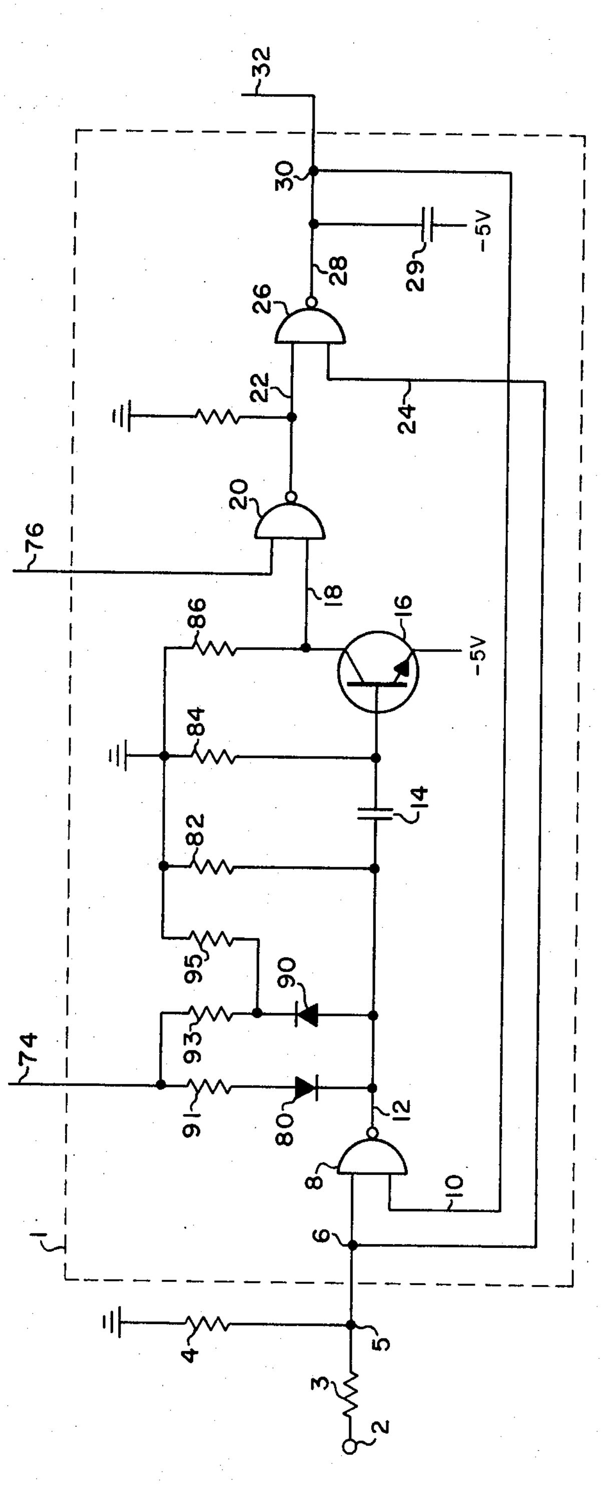
FIG. 3 is a schematic diagram of a first timer of FIG. 1 which shows how the timer may be modified so that the minimum "make" interval may be set to have an interval that is different from the initial delay interval of the "break" interval.

The 17 millisecond delay initiated by the first timer insures that a minimum "make" interval will always occur between "break" intervals of the pulse. In an alternative arrangement, the timing interval for the "make" interval can be changed from that of the "break" interval so that the minimum "make" interval can be greater or less than the 17 milliseconds initial delay illustrated at 110 in waveform C, FIG. 2. Such an alternative arrangement is shown in FIG. 3. Most of the circuitry is the same as that shown in FIG. 2. To simplify the drawing only the input circuit and the first timer are included in the drawing. It is to be understood that interconnections between the first and second timers would be identical and that the second timer and the logic output circuitry would be the same as shown in FIG. 1. All that is required is to change the value of resistor 78 which is shown in FIG. 3 as resistor 91 and to add diode 90 and resistors 93 and 95. The mode of operation will be described later.

Referring again to FIG. 1, an off-hook condition would be applied to the input lead 2 of the pulse correcting circuit when the circuit is seized by the telephone switching equipment. The office battery voltage of −24 volts or −48 volts is reduced to an acceptable value for the logic circuitry by means of the voltage divider consisting of resistors 3 and 4. The voltage between junction 5 and ground is about −5 volts which is an acceptable value for the low level integrated logic circuits use in this embodiment. This negative condition may be represented as a 0 in the logic relationship. With a 0 on one input lead of NAND-gate 8, the output will remain a 1 (ground) regardless of the condition on the other input. The charge on capacitor 14 will remain at 4 volts and transistor 16 will continue to conduct. Thus, NAND-gate 20 will have a 1 output, which is applied to one input of NAND-gate 26 via lead 22. The other input to NAND-gate 26 is a 0 being obtained from the input circuit via lead 2, resistor 3, junction 5 and lead 24. With inputs of 1 and 0 the output of NAND-gate 26 is a 1. This state is fed back via output lead 28, junction 30 and lead 10 to one input of NAND-gate 8. A capacitor 29 is connected between the output of NAND-gate 26 and the −5 volts potential to stabilize operation and to slow down the change in output state. This prevents gate 26 from responding to spurious input changes on lead 24, for example.

NAND-gate 36 now has inputs of 1 and 1 and thus provides a 0 output. For this reason the inputs to NAND-gate 42 each change, going from 1 0 to 0 1, which results in no change in output. However, the voltage on lead 44 now approaches close to ground potential since the voltage divider network comprising resistors 46 and 48 is connected at either end to ground. Capacitor 50 thus charges to approximately 4 volts with the connection to transistor 54 base side being negative. Transistor 54 continues to conduct so that inverter 60 has a 0 at its input and, thus, provides a 1 output which is applied to one input of NAND-gate 36 via lead 62.

The pulsing sequence consists of a series of "break" and "make" intervals with the "break" intervals representing the number of digits in each dialed number. When a "break" occurs as represented by 112 in waveform B of FIG. 2, the input to NAND-gate 8 via input lead 2 is a 1. The feedback input from NAND-gate 26 is a 1, since capacitor 29 does not discharge instantaneously. The output of gate 8 changes to 0 which applies a negative input to the base of transistor 16 which turns the transistor off. The collector output voltage is now at ground and this condition is applied to an input of NAND-gate 20 via path 18. Gate 20 now has 1 1 inputs so that its output is 0 which keeps the gate 26 output at 1. The charge on capacitor 14 will begin to decrease via resistor 84. Initially, then, there is no change in the circuit states of the second timer. If the "break" 112 interval has a duration that is less than 17 milliseconds, then the pulse is not seen by the output timer circuitry and the input timer circuitry will revert back to the off-hook status. However, if the "break" interval 112 is greater than 17 milliseconds then the "break" interval will be recognized by the output timer circuitry.

Following the 17 milliseconds delay, transistor 16 will begin to conduct because of the bias voltage developed across resistor 84 which is connected between ground and the base of the transistor. This places the collector at about −5 volts so that the input to NAND-gate 20 via path 18 now is a 0 and the output of gate 20 changes from 0 to 1. Since pulse portion 112 is still a "break," NAND-gate 26 has inputs of 1 and 1 so that its output now changes to 0. The 17 milliseconds delay is shown at 110 of waveform C, FIG. 2.

With a 0 input applied via path 28, junction 30, paths 32 and 34 to one input of gate 36, the output of gate 36 will be a 1 regardless of the condition on the other input. NAND-gate 8 again has inputs of 1 0 and a 1 output and capacitor 14 will begin to recharge via resistor 82, diode 80 and resistor 78. Also, NAND-gate 42 inputs will change from 0 1 to 1 0 so that its output will remain 1. However, with a 0 (−5 volts) applied to resistor 46 of the voltage divider comprising resistors 46 and 48, the voltage at junction 45 will again be about −3.6 volts. With the minus voltage applied to this side of the charged capacitor 50, a negative bias voltage of about −7.6 volts will be applied to the base of transistor 54 turning the transistor off. Capacitor 50 will discharge at a rate of about 1 millisecond per millisecond from an equivalent charge of 50 milliseconds. The final discharge state of capacitor 50 will still provide a time delay interval equal to 17 milliseconds. Thus, if the "break" interval is 50 milliseconds, the "break" interval at the output will still be at least 50 milliseconds because the presence of the "break" will not be known by the output timing circuits until it has existed for 17 milliseconds. Then, there will be a 33 milliseconds discharge time plus at least a 17 milliseconds final interval before transistor 54 again begins to conduct. By holding 54 nonconducting for a minimum of 50 milliseconds following recognition of a "break" interval of a pulse at junction 30, a minimum 50 milliseconds "break" interval is assured. This is accomplished via inverter 60 which has a 1 input and a 0 output during this "break" interval that is determined by the second timer circuitry. This 0 output maintains the 1 output from NAND-gate 36 for the desired time interval. So long as there is a "break" input to NAND-gate 8, as hereinabove noted, NAND-gate 36 will provide a 1 output. If this "break" interval equals or exceeds the 50 milliseconds minimum, then there will be added to that interval an additional 17 milliseconds which will compensate for the loss in the original interval because of the initial delay caused by the input timing circuitry.

A "split" could occur as illustrated by the interval 108 of the "break" interval of the pulse which is shown in waveform B, FIG. 2. This momentary change causes the output of NAND-gate 26 to change from 0 to 1. This would change the voltage applied to junction 37 at one end of the voltage divider. Further, NAND-gate 42 would have inputs of 1 1 causing a 0 output. This is applied to junction 45 of the voltage divider network and to one side of capacitor 50, which momentarily increases the base bias on transistor 54. This holds 54 off and thus the output timer ignores the "split." Thus, corrected waveform C, FIG. 2, does not show the "split" that occurred in the input "break" interval of the pulse.

Once the output timer has timed out, a "make" interval at the input to the input timer, i.e., a 0 on input connection 2, will result in the following sequence of events. NAND-gate 26 will have a 0 input applied via path 24 causing the output to change from 0 to 1. On timeout of the output timer, transistor 54 will be conducting which places a −5 volts, 0, input from the collector to inverter 60 via path 58, which is changed to a 1 at the inverter output. The 1 input from path 62 coupled with a 1 input from path 34 causes the NAND-gate 36 output to change from 1 to 0. Thus once the output timer has timed out, the "make" interval of the pulse will immediately change the output condition of the pulse corrector to reflect the change at the input. It should be remembered, however, that the output timer will hold the "break" interval for 17 milliseconds after the termination of the "break" input to the pulse correction circuitry via path 2. Thus, the corrected "break" interval of the pulse interval will exist 17 milliseconds after termination of the "break" condition as shown in waveform C, FIG. 2.

A short "break" interval is shown as a part of pulse 120, waveform B, FIG. 2. Also shown at 108 is a "split" condition in the "break" interval. The initial "break" interval 117 is longer than 17 milliseconds, in fact, it is about 20 milliseconds, which as hereinbefore explained is of sufficient duration to initiate the output timer. Thus a minimum corrected "break" interval of 50 milliseconds would appear at the output and this is shown at 115, waveform C, FIG. 2. On time out, a "make" pulse will occur because transistor 54 will turn on causing a 0 to appear on the input to inverter 60. A 1 output will appear at inverter 60 output and gate 36 will have 1 1 inputs which causes its output to change to 0. As shown by a comparison of waveform B and C of FIG. 2, the "make" interval of the input pulse illustrated by 121 is still present after the output timer has timed out as represented by the corrected "break" interval 115, waveform C. The "make" interval then begins and will last for the remainder of the "make" input plus the 17 milliseconds of the "break" portion of the succeeding pulse. This is illustrated by corrected waveform C at 118 and by comparison of this corrected waveform with the uncorrected waveform in B. Thus the desired minimum "break" and minimum "make" intervals of the pulse interval can be obtained using the preferred embodiment of the invention illustrated in FIG. 1.

When it is desired to use different timing intervals for the initial delay, before the first "break" interval, and for the minimum "make" interval, a circuit arrangement as shown in FIG. 3 may be used. As an example, it may be desirable to retain the 17 milliseconds initial delay interval but to have a minimum "make" interval that is more than one-half that desired in the ideal pulse. For instance, a minimum "make" interval of 26 milliseconds may be selected, and the minimum "break" interval of 50 milliseconds, determined by the second timer, may be retained. As hereinabove explained with respect to FIG. 1, an off-hook condition would be applied to input lead 2 of the pulse correcting circuit when the circuit is seized by the telephone switching equipment. With a 0 on one input lead of NAND-gate 8, the output will be a 1 regardless of the state of the other input. Initially the charge on capacitor 14 will be approximately 4 volts. Transistor 16 is conducting so that a 0 will be applied to one input of NAND-gate 20 via lead 18. This will cause a 1 output which is applied to NAND-gate 26 via lead 22. The off-hook, "make," state is 0 and is applied to the other input of gate 26 so that gate 26 has a 1 output. Capacitor 29 holds the charge which slows down the changes in state at junction 30. Thus, if the input states to gate 26 are such that the output should change from 1 to 0, there is a time delay before the output discharges to the 0 state.

Under the off-hook input conditions outlined above, NAND-gate 36 has inputs of 1 and 1 thus providing a 0 output. This output appears as a 0 on lead 74 since this lead is connected directly to the output of gate 36 as shown in FIG. 1. Lead 76 has a 1 input since it is connected to the output of inverter 70.

With a 0 on lead 74 and a 1 at the output of gate 8, diode 90 will conduct. Resistors 93 and 95 form a voltage divider between ground and −5 volts so that the voltage at the anode of diode 90 is about −2 volts, and this is the value seen by the gate 8 side of capacitor 14. Capacitor 14 will thus begin to discharge, but will leave sufficient charge so that 17 milliseconds delay will be experienced by a subsequent "break" interval applied to input lead 2.

Thus a "break" following the off-hook seizure will be delayed before its presence is indicated at the output of gate 26. Once the "break" condition, i.e., a 0, appears at the output of the first timer, the input condition on lead 74 changes from 0 to 1. Further, gate 8 has inputs of 1 and 0 so its output is 1. Transistor 16 is conducting so there is a voltage of about 4 volts applied to capacitor 14 and the capacitor will charge to this voltage before the end of the minimum "break" interval. The subsequent "break" interval may be applied to input lead 2 of the first timer prior to time out of the second timer. This will change the output of the first timer from 0 to 1, but will not change the output of the second timer. Capacitor 14 will be charged to its maximum potential which provides the equivalent of 26 milliseconds of delay. Once the second timer times out the input to NAND-gate 36 via inverter 60 and lead 62 is a 1 so that gate 36 inputs are 1 and 1 which causes a 0 output. This 0 is now applied to lead 74 which again causes capacitor 14 to discharge. The discharge rate is 1 millisecond per millisecond from a maximum of 26 milliseconds down to a minimum of 17 milliseconds. Thus, if the "make" input on lead 2 is retained for 5 milliseconds after the output timer has timed out, there will remain a delay of 21 milliseconds in the first timer. The "make" interval will then be 26 milliseconds only 5 milliseconds of which were obtained from the input pulse.

It is apparent that other timing values may be employed with only simple changes in the RC timing circuits. Of course, other timing techniques could be employed without departing from the spirit of the invention.

What is claimed is:

1. A dial pulse correcting circuit for providing a minimum time duration for each "make" interval and each "break" interval of a dial pulse signal comprising:

first timing means having an input which accepts the dial pulse signal, an output, and a first delay means connected between the input and output, said first delay means providing first and second predetermined time intervals, said first interval providing a fixed delay period between the appearance of a "break" interval at the input and its appearance at the output, and said second interval providing a minimum "make" interval at said output when said "make" interval is less than said second interval;

second timing means having one input operatively connected to the output of said first timing means, a second delay means connected between said one input and the output of said second timing means, the second delay means providing a "break" interval at said output of the second timing means in response to a "break" interval input from the output of the first timing means, the output provided by said second delay means having a minimum "break" interval when the output from said first timing means is less than said minimum and a "break" interval equal to the "break" interval of said dial pulse signal when the "break" interval is longer than said minimum; and logic means responsive to the said outputs of said first and said second timing means to provide a corrected pulse signal output.

2. A dial pulse correcting circuit according to claim 1 in which the first delay means further comprises a first time integration means, said integration means being deactivated by a change in the dial pulse from a second logic state to a first logic state to provide a decaying measure of the on-time of said first state, and momentarily activated when the dial pulse momentarily changes back to the second logic state to interrupt the decaying measure of the on-time of said first state, thereby providing a decaying memory of the first state so that momentary changes of state are integrated in said first delay means.

3. A dial pulse correcting circuit according to claim 2 in which said integration means is deactivated by a change in state from the "make" interval to the "break" interval.

4. A dial pulse correcting circuit according to claim 1 in which said second delay means further comprises a second time integration means, said second time integration means being activated by a change from a first logic state to a second logic state of the output from said first timing means, to provide a measure of the on-time of said second state, and deactivated when the output of said first timing means changes from said second state to said first state, thereby providing a decaying memory of the second state so that momentary changes of state may be integrated by said second delay means.

5. A dial pulse correcting circuit according to claim 4 in which said second integration means is activated by a change in the state of the output from said first timing means when said output changes from the "break" interval to the "make" interval.

6. A dial pulse correcting circuit according to claim 2 in which said first timing means further comprises:

a binary logic input circuit having two inputs and an output, one input being connected to receive the dial pulse signal and the other input being connected to the output of said first timing means, the binary logic circuit providing an output of a second logic state when the two inputs are each of a first logic state and providing an output of a first logic state for all other input combinations;

a first diode and a first resistor, the cathode of the diode connected to the output of the binary input logic circuit, the anode of the diode connected to one terminal of the first resistor and the second terminal of said resistor being operatively connected to said logic means and responsive to the corrected pulse output, the series diode-resistor circuit being operative to reduce the on-time of the first time integration means when the second timing circuit output is in a first logic state and the output of the binary input logic circuit is in a second logic state;

a second resistor and a third resistor;

a second diode having its anode connected to the output of the binary logic input circuit, the cathode of the second diode is connected to one terminal of the second and third resistors, the other terminal of the third resistor is connected to ground and the other terminal of the second resistor is connected to the output of said second timing means thus operatively providing a second means for altering the on-time of the first time integration means to provide first and second predetermined time intervals;

switching means having an input and an output, the input is operatively connected to the output of the first time integration means which provides an input to the switching means such that the output of the switching means is in the second logic state during normal conditions but is in the first logic state for the duration of the first predetermined time interval, and in the second logic state for the second predetermined time interval.

7. A dial pulse correcting circuit according to claim 1 in which the first delay means further comprises a first charge storage means, said storage means being activated to accept a charging current when the dial pulse is in a second logic state, the charge stored providing a measure of the first predetermined time interval, a discharge means, said storage means being operatively connected to said discharge means when the dial pulse is in a first logic state to reduce the effective on-time of said first state, thereby providing a decaying memory of the first state.

* * * * *